United States Patent [19]

Marino et al.

[11] Patent Number: 5,378,010
[45] Date of Patent: Jan. 3, 1995

[54] SUSPENSION SYSTEM FOR TRAILER

[75] Inventors: Robert L. Marino; Donald J. Burns, both of Bradenton, Fla.; Leo Davis, Richardson, Tex.

[73] Assignee: Oshkosh Truck Corporation, Oshkosh, Wis.

[21] Appl. No.: 950,419

[22] Filed: Sep. 23, 1992
(Under 37 CFR 1.47)

[51] Int. Cl.⁶ .......................................... B60G 11/60
[52] U.S. Cl. .................................. 280/723; 267/259; 267/277; 280/664; 280/665; 280/689; 280/710; 280/713; 280/726
[58] Field of Search ............... 280/723, 721, 710, 713, 280/688, 689, 662, 665, 664, 725, 726, 495, 789; 267/277, 285, 259

[56] References Cited

U.S. PATENT DOCUMENTS

| | | | |
|---|---|---|---|
| 2,465,098 | 3/1949 | Inskeep | 267/57 |
| 2,490,311 | 12/1949 | Levesque du Rostu | |
| 2,859,977 | 11/1958 | De Lorean | |
| 2,941,815 | 6/1960 | Muller | |
| 3,214,047 | 10/1965 | Moye | 280/789 |
| 3,448,995 | 6/1969 | Stallard et al. | |
| 3,785,672 | 1/1974 | Shakespear | |
| 4,337,958 | 7/1982 | Witt et al. | 280/16 |
| 4,415,181 | 11/1983 | McCall et al. | 280/700 |
| 4,473,238 | 9/1984 | Antoine | 280/723 |
| 4,580,808 | 4/1986 | Smith-Williams | 280/700 |
| 4,641,856 | 2/1987 | Reichenbach | 280/772 |
| 4,741,516 | 5/1988 | Davis | 267/64.13 |
| 4,804,198 | 2/1989 | Imai et al. | 280/21.1 |
| 4,842,298 | 6/1989 | Jarvis | 280/689 |
| 4,919,441 | 4/1990 | Marier et al. | 280/21.1 |

FOREIGN PATENT DOCUMENTS

| | | | |
|---|---|---|---|
| 1000140 | 1/1957 | Germany | 280/688 |
| 1160313 | 12/1963 | Germany | 280/723 |
| 272974 | 4/1951 | Switzerland | 267/285 |

Primary Examiner—Eric D. Culbreth
Attorney, Agent, or Firm—Foley & Lardner

[57] ABSTRACT

A suspension system for a vehicle having a support frame includes a set of wheel assemblies, a swing arm attached to each of the wheel assemblies, a torsion bar assembly interconnecting the swing arms and a shock absorbing and dampening device located between the supported frame and the torsion bar assembly whereby a load imposed on one of the wheel assemblies due to turning of the vehicle will transmit a torque to one portion of the torsion bar assembly, which torque is resisted by the shock absorbing device and another portion of the torsion bar assembly.

14 Claims, 3 Drawing Sheets

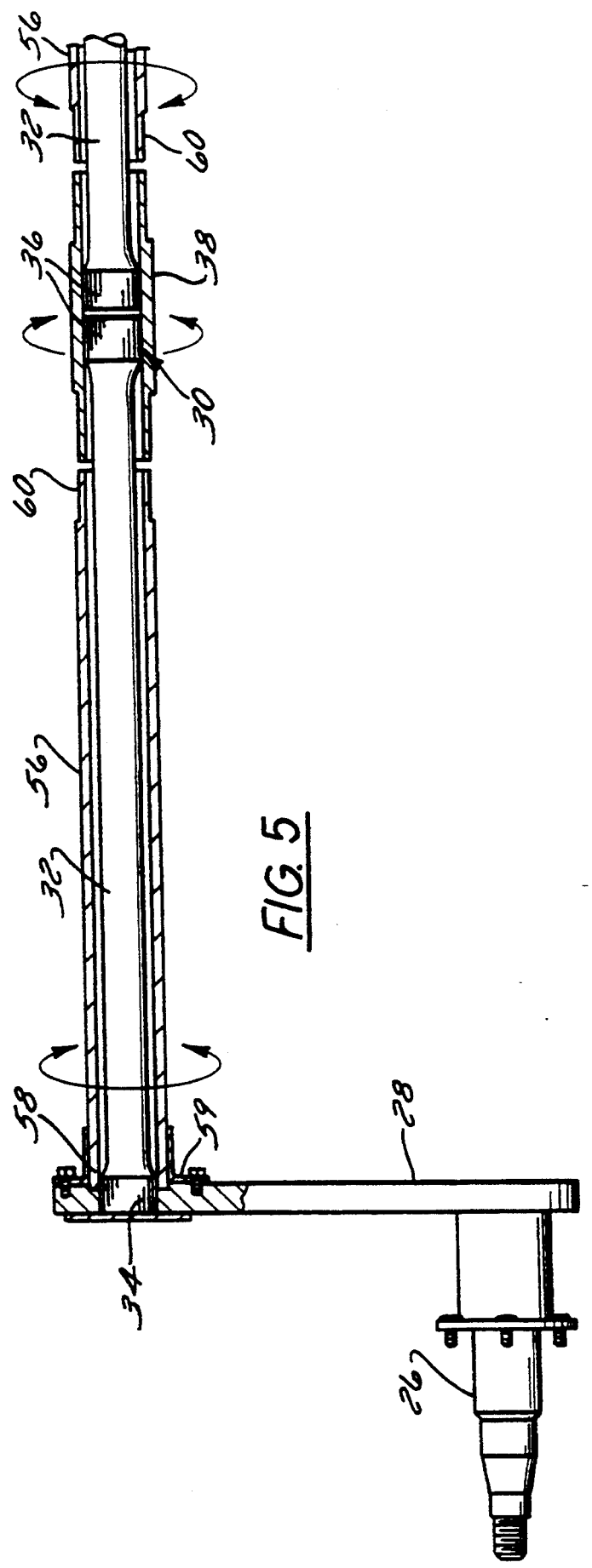

SUSPENSION SYSTEM FOR TRAILER

TECHNICAL FIELD

The present invention relates generally to suspension system for wheeled vehicles subjected various loads and, more particularly, to a suspension system for absorbing and attenuating road and ground shock imposed on a trailer.

BACKGROUND OF THE INVENTION

In designing suspension systems for wheeled vehicles, and in particular trailers, engineers must consider the ride quality as well as the roll stiffness or stability desired for the trailer application. This consideration is even more challenging when evaluating the ride dynamics of the trailer so it will not appreciably degrade the mobility characteristics of its companion prime mover or pulling vehicle. Ride quality, of course, relates to the degree of hardness or softness of ride afforded by the spring and damping behavior of the suspension system. Roll stiffness refers to the resistance of the suspension system to rolling or tilting of the vehicle framework as might occur due to centrifugal force during a turning maneuver.

Prior art suspension systems attempting to seek these handling characteristics have incorporated various combinations of torsion bars, shock absorbing and dampening devices and stiffening tubes or sleeves. One example of a wheel suspension is shown in U.S. Pat. No. 2,465,098 issued Mar. 23, 1949 to Inskeep. In this trailer arrangement, the springing of the wheels results from the resiliency of the one piece axle or torsion bar which transmits all of the torsional load to a non-rotative, flattened position of the torsion bar connected to the center of the frame. Bearing sleeves are operative to prevent radial deflection of the torsion bar. A further showing of a suspension system having a sway torsion bar protected by a tube or sleeve is seen in U.S. Pat. No. 4,842,298 issued Jun. 27, 1989 to Jarvis.

Other examples of suspension systems utilizing shock absorbers interconnected with torsion bars are disclosed in U.S. Pat. No. 3,448,995 issued Jun. 10, 1969 to Stallard, et. al. and U.S. Pat. No. 4,337,958 issued Jul. 6, 1982 to Witt, et. al. In the '995 anti-roll system, a combined shock absorber and spring is mounted in proximity to each wheel on a trailer and joined to a single torsion bar which transfers moments from one wheel to the other wheel to reduce sway. In the '958 stabilization system for a snowmobile, a shock absorber is coupled to the center and restricts rotation of a torsion bar in response to a twisting force created at the steerable skis secured to the ends of the torsion bar. U.S. Pat. No. 4,641,856 issued Feb. 10, 1987 to Reichenbach further discloses an anti-roll stabilizer system employing separate shock absorbers operatively connected to the wheels and an adjustable hydraulic cylinder to selectively restrain the rotation of a torsion bar relative to a chassis to vary the roll stiffness of the suspension system.

Each of the above arrangements fails to define a suspension system wherein a twisting moment or torque transmitted to a torsion bar is efficiently absorbed in shared distribution between the frame and another portion of the torsion bar. In addition, these prior art suspensions cannot properly handle a bending moment or vertical deflection imposed on a wheel assembly. This is true, in part, either because of the absence of a stiffening sleeve or the simple inclusion of a sleeve about a torsion bar without providing proper support to prevent interference contact between the sleeve and torsion bar. Furthermore, none of these arrangements contemplates the reduction of wheel camber by proper bearing support of the stiffening sleeve. Moreover, predecessor designs also cannot provide shock absorbing and dampening devices in combination with torsion bar assemblies wherein the spring rate of the suspension system may be varied along with disposition of the framework by variably pressurizing the shock absorbing and dampening device.

SUMMARY OF THE INVENTION

The present invention provides an improved suspension for wheeled vehicles subjected to various loads. The improved suspension system enhances ride handling characteristics while avoiding high friction coefficients and poor bearing life which can cause unreliability in conventional systems. The suspension system of the present invention enables rapid, often instantaneous, reaction and greater damping power which reduces not only the magnitude of impact but also significantly reduces the number of sequential impact cycles transmitted to the vehicle frame.

The present invention further provides a suspension system for a vehicle having a support frame with a set of wheel assemblies, a swing arm attached to each of the wheel assemblies, a torsion bar assembly interconnecting the swing arms, sleeves extending along substantially the entire length of the torsion bar assembly, and bearings operatively associated with the sleeves for retaining the sleeves in spaced relation to the torsion bar assembly regardless of a load imposed on one of the wheel assemblies.

The present invention also relates to a suspension system for a vehicle having a support frame with a set of non-steerable wheel assemblies, a swing arm attached to each of the wheel assemblies, a torsion bar assembly interconnecting the swing arms and a shock absorbing and dampening device disposed between the support frame and the torsion bar assembly whereby an increase in load imposed on one of the wheel assemblies due to turning of the vehicle will transmit a torque to one portion of the torsion bar assembly, which torque is resisted by the shock absorbing and dampening device and another portion of the torsion bar assembly.

In a preferred embodiment, the invention further contemplates a suspension system for a trailer having a support frame drawn over various road and ground profiles and subjected to various loads. The suspension system comprises a set of wheel assemblies, each including an axle and a wheel mounted for rotation on the axle, pivotable swing arm attached to each of the wheel assemblies and a torsion bar assembly interconnecting the swing arms and comprising a set of torsion bars operably aligned with each other along a common longitudinal axis with each of the torsion bars having inner and outer ends. A variably pressurized shock absorbing and dampening device is pivotably disposed between the support frame and the torsion bar assembly and is extendable and retractable to pivot the swing arms and move each of the wheels with respect to the support frame to vary the disposition of the support frame relative to the ground, and simultaneously alter the spring rate of the suspension system. The shock absorbing and dampening device further restricts rotation of the inner end of the torsion bar assembly upon reaction to torque at one of the wheel assemblies to vary the roll stiffness of the trailer. A set of rigidifying sleeves are rotatably mounted about the torsion bar assembly along substantially the entire length except for the inner ends of the torsion bars with each of the sleeves having inner and outer ends provided with a set of bearings thereon.

The invention also provides a suspension system for reducing camber of a wheel on a ground vehicle having support frame subjected to various loads in which there is defined an effective lever arm over which a force imposed on one of the wheel assemblies is transmitted substantially maintain the perpendicular stance of a wheel with respect to the ground.

BRIEF DESCRIPTION OF THE DRAWINGS

The invention will be described with reference to the appended drawings, wherein:

FIG. 5 is an enlarged, cross sectional view taken on line 5—5 of FIG. 3.

DETAILED DESCRIPTION OF THE PREFERRED EMBODIMENT

Figure 1:
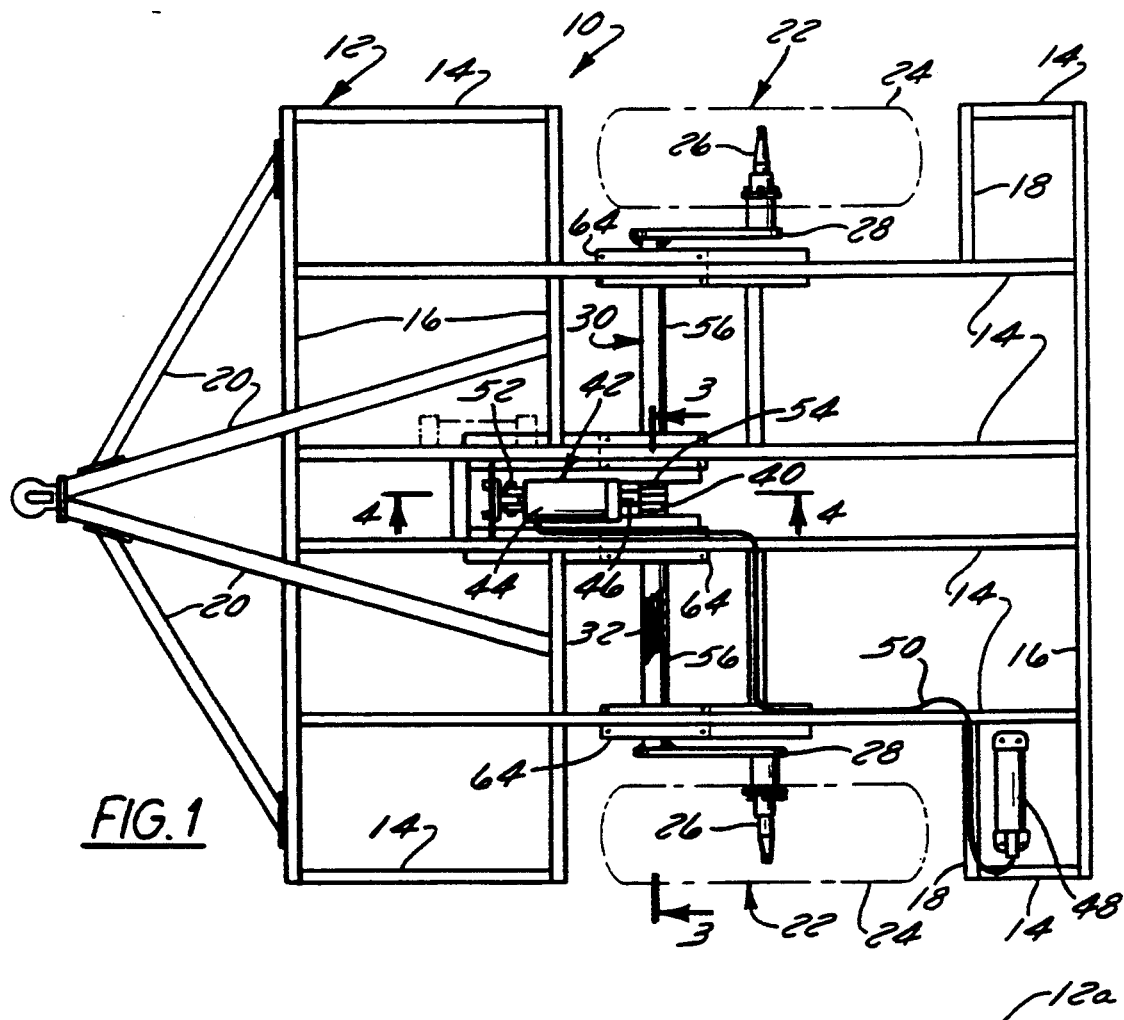
FIG. 1 is a fragmentary, top view of a suspension system embodying the present invention.

Referring initially to FIG. 1, a suspension system is shown mounted onto a wheeled vehicle in the form of a trailer 10. In the preferred embodiment, trailer 13 it a heavy duty support vehicle capable of bearing typical pay-loads of 1500–2700 pounds in a military environment. Trailer 10 must be compatible with its prime mover pulling vehicle in tracking, ride dynamics and following capability in negotiating varying grades and slopes owner all terrains without causing interference with the prime mover. When operationally configured, trailer 10 is designed not to appreciably degrade the mobility characteristics of its pulling vehicle so that trailer 10 may travel faster over rough terrain, a feature particularly desirable in combat support.

Figure 2:
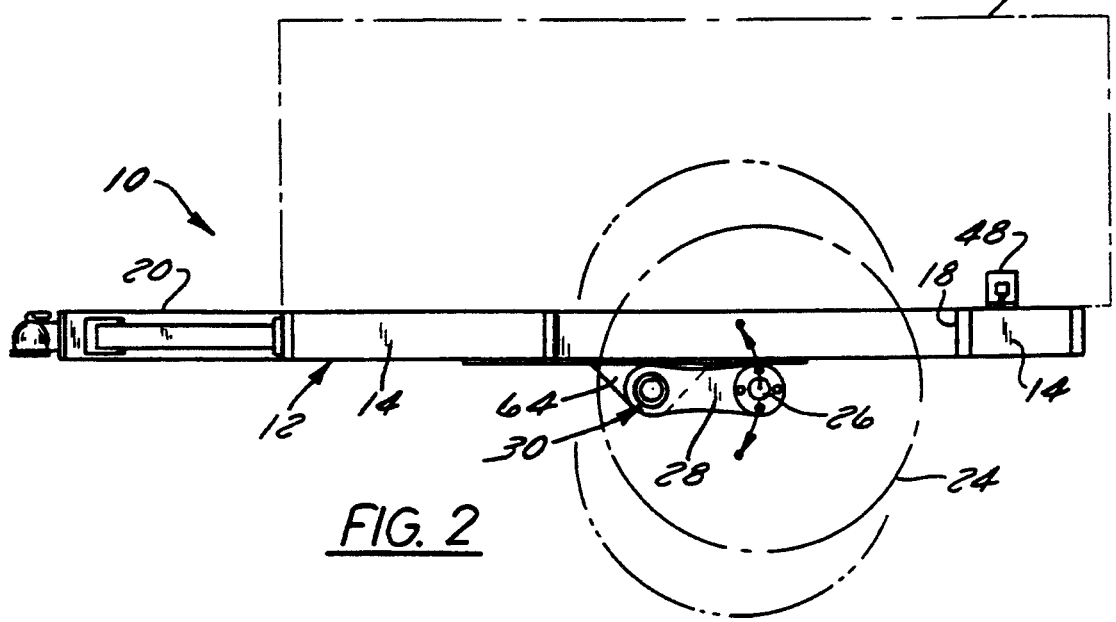
FIG. 2 is a side elevational view of the suspension system shown in FIG. 1.
Figure 3:
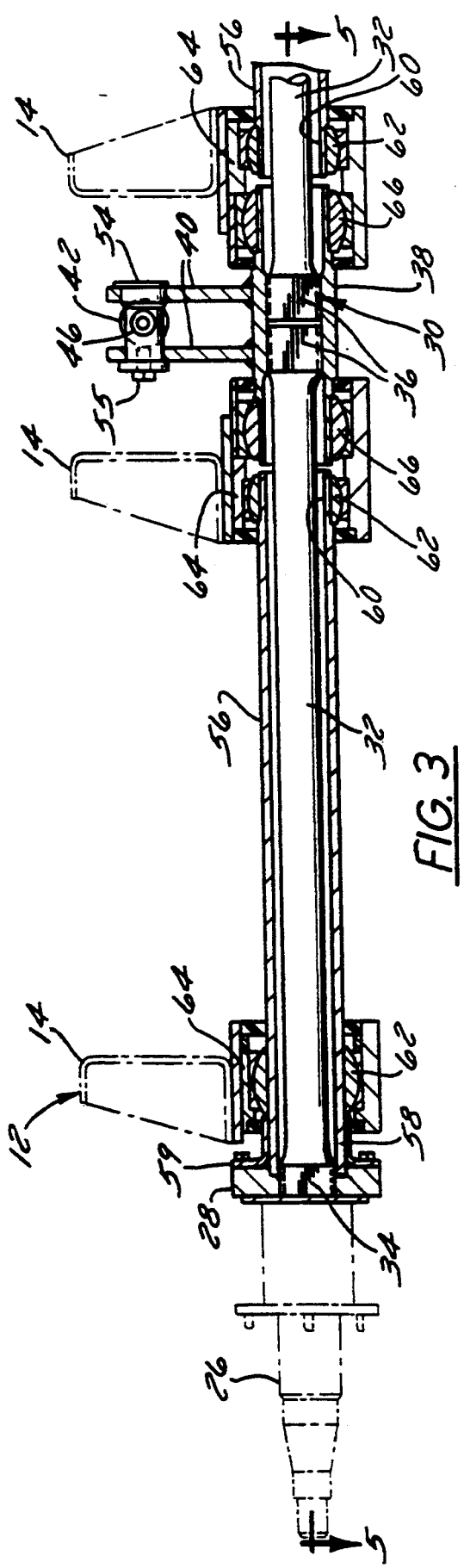
FIG. 3 is an enlarged, cross sectional view taken on line 3—3 of FIG. 1.

Now referring to FIGS. 1 and 2, trailer 10 includes a rigid support frame 12 having longitudinal beams 14 connected to transverse beams 16 and rear braces 18. Two sets of angular support bars 20 project from the front of trailer 10 to define a tongue. A suitable bed or enclosure 12a is mounted upon support frame 12 for conveying heavy duty cargo or the like. On each side of support frame 12 is a non-steerable wheel assembly 22 comprising a wheel 24 mounted for rotation on an outwardly projecting stub axle or spindle 26. Each axle 26 is secured to the rear end of a pivotable swing or trailing arm 28, the forward end of each arm 28 being interconnected by a torsion bar assembly 30 disposed generally parallel to transverse beams 16 and perpendicular to the direction of travel of trailer 10. As best seen in FIGS. 3 and 5, assembly 30 comprises a pair of generally cylindrical torsion bars 32 operably aligned with each other along a common longitudinal axis and used to transmit torque from each of wheel assemblies 22. Each torsion bar 32 has an outer end 34 joined to respective swing arm 28 and an inner end 36 fixedly joined inside a collar 38 of a movable clevis 40 extending upwardly into support frame 12.

Figure 4:
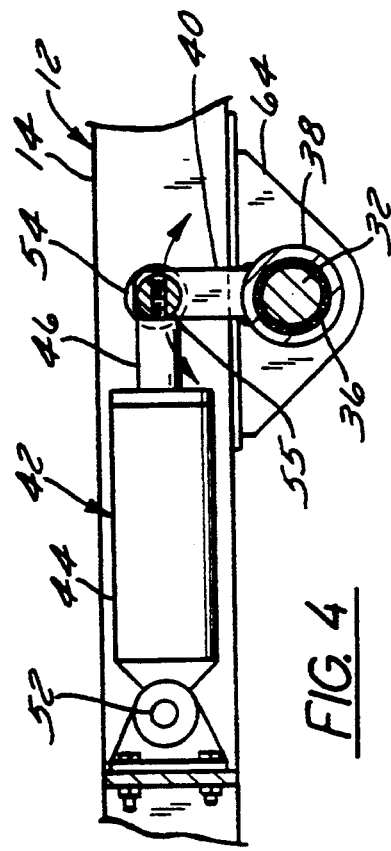
FIG. 4 is an enlarged, cross sectional view taken on line 4—4 of FIG. 1.

Focusing on FIGS. 1 and 4, a shock absorbing and dampening device 42 is pivotably disposed between support frame 12 and torsion bar assembly 30. Device 42 includes a cylinder 44 and piston rod 46 extendable and retractable with respect to cylinder 44 upon variable pressurization of a compressible fluid, preferably a silicon-base liquid, inside cylinder 44.

Tuning of device 42 is normally manually obtained using an auxiliary pump 48 which is accessibly mounted on the rear corner of support frame 12 and in communication with the interior of cylinder 44 via fluid lines 50. As seen in FIG. 4, cylinder 44 is pivotably mounted at 52 secured at a bearing aperture 54 to clevis 40. Bearing aperture 54 is configured to receive a pivotable pin 55 which is attached to piston rod 46 as illustrated in FIGS. 3 and 4. With this arrangement, extension of piston rod 46 will be translated to clevis 40 and collar 38 fixed to torsion bar assembly 30, thereby creating a wrenching or twisting force to be applied to torsion bar assembly 30 for purposes to be understood hereafter. This twisting force is in turn transferred to swing arms 28 which are pivoted over a limited range of motion (most preferably about 49°) to shift wheels 24 and thus change the attitude of the trailer bed 12a.

Device 42 further acts as a fluid suspension spring and damper of the type fully disclosed in U.S. Pat. No. 4,741,516 issued on May 3, 1988 to Davis. Using such a device not only replaces the prior art combination of shock absorber and spring for controlling the ride properties of the vehicle but affords the versatility of enabling the spring rate to be adjusted on site.

FIG. 3 best illustrates a pair or set of rigidifying tubes or sleeves 56 employed to react to bending or vertical moments imposed on the sleeves 56 as well as horizontal reactions on torsion bar assembly 30. Sleeves 56 are not continuous in all dimensions and are rotatably supported at each end by bearings 62. Sleeves 56 extend along the entire length of torsion bars 32. Each of sleeves 56 has an outer end 58 cooperating with a flange 59 fastened to respective swing arm 28 and an inner end 60 disposed adjacent collar 38. It can thus be appreciated that clevis 40 is rigidly connected to a mid-portion of torsion bar assembly 30 between sleeves 56. Outer end 58 and inner end 60 each carry bearings 62 suspended from support frame 12. By way of example, the type of bearing 62 will vary depending upon the application, however, the presently preferred embodiment utilizes spherical bearings 62 suspended from frame 12 with pillow blocks 64.

Bearings 62 keep torsion bars 32 consistently spaced from sleeves 56 in a fixed amount or dimension. Preferably, sleeves 56 are spaced from the bars 32 by approximately one quarter inch, regardless of bending moments. In this fashion there will be no interference fit under load which could destroy the spring characteristics of the suspension. Also disposed within innermost pillow block 64 is an additional set of bearings 66 (e.g. spherical bearings) mounted on the ends of collar 38.

In use, assuming trailer 10 has been loaded, one Lay adjust the suspension by using auxiliary pump 48 to pressurize device 42 so as to cause movement of piston rod 46. This linear motion will be converted to rotary motion on the torsion bar assembly 30 such that swing arms 28 will shift wheels 24 and support frame 12 accordingly with respect to the ground. At the same time, the pressure of the compressible fluid inside cylinder 44 is changed from a previous value so that the spring characteristics of the suspensions are suitably altered.

With device 42 pressurized, the linear force exerted by piston rod 46 has been converted via clevis 40 into a torsional force for restraining rotation of the torsion bar assembly 30. Therefore, a load imposed on one of wheel assemblies 22 such as during a turning maneuver, will transmit a torque to one portion of torsion bar assembly 30, which torque is resisted in shared distribution by device 42 connected to support frame 12, and by the other portion of torsion bar assembly 30. Concurrently, any bending moment imposed on sleeves 56 will be resisted by sleeves 56 supported by the symmetrical set of bearings 62 such that deleterious contact between torsion bar assembly 30 and sleeves 56 in prevented. In addition, it should be understood that due to the presence of each sleeve 56 and support of its inner end 60 by bearings 62, an effective lever arm is defined over which a force imposed on one of wheel assemblies 22 is transmitted to substantially maintain the perpendicular stance of the loaded wheel 24 with respect to the ground. Otherwise stated, the inventive arrangement advantageously reduces cambering or canting of the wheel 24 about its axle 26.

It should be appreciated that using shock absorbing and dampening device 42 affords a quicker rate of compliance than previously available in prior art systems. Incident thereto, the potential buildup in the wheels and other components is reduced, enabling faster travel velocities without loss of vehicle control while reducing the peak transmitted force to the various unsuspended components. As a consequence, a lesser peak impact force is generated resulting in the need for less energy to be dissipated. In addition, device 42 has the ability to reject heat internally during dynamic operation in order to provide greater damping rates and continuous spring rate characteristics.

Unlike prior art suspension systems, in whitish applied torque is transferred to a central locus on the vehicle frame, the present invention allows such torque transmitted along one portion of torsion bar assembly 30 to be distributed between shock absorbing and dampening device 42 as well as another portion of torsion bar assembly 30. Due to the effective length of torsion bar 32, the amount of twist or wind up will be greater than that of prior art torsion bars. Torsion bar 32 is therefore considerably less stiff than a shorter torsion bar. All things being equal, the present invention offers a torsion bar with better flexibility so that it will more efficiently attenuate shock and vibration from the road.

With this innovative arrangement, there is provided a passive suspension system which allows for increased payload and improved all-terrain mobility for trailers and other vehicles. The system reacts responsively and consistently using an uncomplicated configuration to handle all loads during static and dynamic modes of trailer operation. The unique interaction among the torsion bars, shock absorbing and dampening device, sleeves and bearings enables an operator to attain an optimum balance between ride quality and roll stability.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth in the following claims.

What is claimed is:

1. A suspension system used in improving quality of ride and roll stability for a vehicle having a support frame subjected to various loads, said suspension system comprising:
    a set of wheel assemblies in opposed relationship for rolling support of a vehicle, each including an axle;
    a swing arm attached to each of said wheel assemblies;
    a torsion bar assembly interconnecting said swing arms;
    a pair of sleeves supported about said torsion bar assembly;
    a shock absorbing device disposed between said support frame and said torsion bar assembly and connected to a collar intermediate said pair of sleeves;
    a first set of bearings operatively associated with an outer end of each sleeve in proximity to each swing arm;
    a second set of bearings independent from said first set of bearings and operatively associated with an inner end of each sleeve and disposed at a spaced distance from said first set of bearings;
    a third set of bearings operatively associated with said collar intermediate said pair of sleeves;
    whereby a load imposed on one of said wheel assemblies will transmit a torque to one portion of said torsion bar assembly, which torque is resisted by said shock absorbing and dampening device and another portion of said torsion bar assembly; said wheel load further transmitting a bending moment to said sleeves, which moment is resisted by said sleeves, the resulting effect being a balance between quality of ride and roll stability.

2. The suspension system according to claim 1, wherein said shock absorbing and dampening device is connected to said torsion bar assembly by a clevis.

3. The suspension system according to claim 1, wherein said torsion bar assembly comprises a pair of torsion bars, each of which has an inner end secured to said clevis and an outer end attached to said swing arm.

4. The suspension system of claim 1, wherein said sleeves are supported on said torsion bar assembly such that, regardless of said bending moment over an operative range, said sleeves remain constantly spaced from said torsion bar assembly.

5. A suspension system for a trailer having a support frame with longitudinal and transverse said trailer to be drawn over various road and ground profiles and subjected to various loads, said suspension system comprising:
    a set of wheel assemblies in opposed relationship for rolling support of a vehicle, each of said wheel assemblies including an axle and a wheel mounted for rotation on said axle;
    a pivotable swing arm attached to each of said wheel assemblies;
    a torsion bar assembly, interconnecting said swing arms, said torsion bar assembly comprising a set of torsion bars operably aligned with each other along a common longitudinal axis, each of said torsion bars having an inner end and an outer end;
    a variably pressurized shock absorbing and dampening device pivotably disposed between said support frame and said torsion bar assembly, said shock absorbing and dampening device being extendable and retractable in a longitudinal direction to decrease vertical inertial forces and to pivot said swing arms and move each of said wheels with respect to said support frame to vary the disposition of said support frame relative to the ground, and simultaneously alter the spring rate of said suspension system, said shock absorbing and dampening device further preventing rotation of said torsion bar assembly upon reaction to torque at one of said wheel assemblies to vary the roll stiffness of said trailer;

a set of rigidifying sleeves supported about said torsion bar assembly, each of said sleeves having an inner end and an outer end where said sleeves are supported near the inner and outer ends;

a first set of bearings positioned on said inner ends of said sleeves;

a second set of bearings independent from said first set of bearings and positioned on said outer ends of said sleeves; and an additional independent set of bearings disposed intermediate said sleeves.

6. The suspension system according to claim 5, wherein said shock absorbing and dampening device includes a compressible fluid variably compressed to alter the spring rate of said suspension system.

7. The suspension system according to claim 5, wherein said bearings retain each of said sleeves in spaced relation from said torsion bar assembly.

8. The suspension system according to claim 5, wherein said torsion bar assembly lies generally transverse to the direction of travel of said trailer.

9. A trailer which can be connected to a pulling vehicle, said trailer comprising:

a framework having a front, a back, a plurality of longitudinal beams, and a plurality of transverse beams connected to said longitudinal beams, said plurality of including a pair of outermost longitudinal beams which are each interrupted to receive a wheel assembly on each side of said framework, said plurality of transverse beams including a front transverse beam disposed at said front of said trailer, a rear transverse beam disposed at said back of said trailer, and at least one transverse beam disposed therebetween;

a trailer tongue having two sets of angular support bars connected to at least two different transverse beams: and a suspension system having:

a set of wheel assemblies in opposed relationship for rolling support of a vehicle, each including an axle and a wheel disposed perpendicular to the ground;

a swing arm attached to each of said wheel assemblies;

a torsion bar assembly interconnecting said swing arms, said torsion bar assembly comprising a set of torsion bars operably aligned with each other along a common longitudinal axis, each of said torsion bars having an inner end and an outer end;

a shock absorbing and dampening device disposed between said support frame and said torsion bar assembly;

a clevis joining each said inner end of said torsion bar to said shock absorbing and dampening device, said clevis having a collar engageable with said inner ends of said torsion bars;

a set of rigidifying sleeves having inner and outer ends, said sleeves being supported on and spaced from said torsion bars, each of said sleeves extending along substantially the entire length of each of said torsion bars;

a first set of bearings mounted on said collar adjacent said shock absorbing and dampening device;

a second set of independent bearings mounted on said inner ends of each of said sleeves; and a third set of independent bearings mounted on said outer ends of each of said sleeves;

said suspension system defining an effective lever arm over which a force imposed on one of said wheel assemblies is transmitted to substantially maintain the perpendicular stance of a wheel with respect to the ground.

10. The suspension system according to claim 9, wherein said first and second sets of said bearings are supported from said support frame in a pillow block.

11. The suspension system according to claim 9, wherein said first and second sets of bearings are spherical bearings symmetrically disposed along said torsion bars and said sleeves.

12. The suspension system according to claim 9, wherein each of said axles is aligned along a common axis, said axis running generally parallel to said common longitudinal axis of said torsion bars.

13. The suspension system according to claim 9, wherein said swing arm has one end attached to said axle and another end connected to said torsion bar assembly and one of said sleeves.

14. The suspension system according to claim 9, wherein said ground vehicle is a trailer drawn by a prime mover.

* * * * *